(12) United States Patent
Guerra (10) Patent No.: US 8,551,601 B2
(45) Date of Patent: *Oct. 8, 2013

(54) STONE, METAL AND TAR LAMINATE FOR EXTERIOR CLADDING

(76) Inventor: Vince Guerra, Ancaster (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,878

(22) Filed: Jul. 5, 2012

(65) Prior Publication Data

US 2012/0276321 A1 Nov. 1, 2012

Related U.S. Application Data (63) Continuation of application No. 10/922,859, filed on Aug. 23, 2004, now Pat. No. 8,241,728.

(30) Foreign Application Priority Data

Mar. 8, 2004 (CA) ..................................... 2460236

(51) Int. Cl.
*B32B 5/16* (2006.01)
*E04D 1/00* (2006.01)

(52) U.S. Cl.
USPC ........... 428/150; 428/143; 428/149; 428/468; 52/556

(58) Field of Classification Search
USPC .................... 428/150, 143, 149, 468; 52/556
See application file for complete search history.

(56) References Cited

U.S. PATENT DOCUMENTS

| 2,798,006 | A * | 7/1957 | Oldfield et al. | 428/143 |
| 3,377,762 | A * | 4/1968 | Chalmers et al. | 52/555 |
| 8,241,728 | B2 * | 8/2012 | Guerra | 428/150 |
| 2002/0081389 | A1 * | 6/2002 | Allman et al. | 427/428 |

\* cited by examiner

*Primary Examiner* — William P Watkins, III
(74) *Attorney, Agent, or Firm* — Frank H. Foster; Kremblas & Foster (57) ABSTRACT

An exterior cladding that combines the benefits of stone, metal and tar in a laminate form that makes the most with the least expensive forms of each of these three base materials. A construction laminate having an asphaltic core body covered with a metallic facing on a top side and part of a bottom side. A granular coating is applied to the metallic facing on the top side and front edge. The laminate is useful as exterior cladding such as a roofing shingle, siding etc. . . . and is durable and easy to install.

7 Claims, 8 Drawing Sheets

STONE, METAL AND TAR LAMINATE FOR EXTERIOR CLADDING

This application is a continuation of application Ser. No. 10/922,859 filed 23 Aug. 2004 and now U.S. Pat. No. 8,241,728.

FIELD OF INVENTION

This invention relates to a laminate for use as an exterior cladding construction material, for example, wall panels and roof tiles. In particular, the invention relates to a laminate which combines three historically proven raw materials: stone, metal and tar.

BACKGROUND OF THE INVENTION

Since the beginning of time, human beings have sought improved materials for shelter. Most of what was used thousands of years ago is still in use today, in one form or another. For example the stone used in caves is used as slate roofing or granite walls. Mud is transformed into bricks and leaves are used in thatch roofing. Modern cladding originates from one form of or a combination of very basic materials.

The historic benefits of stone, metal and tar don't come without some drawbacks. For example stone, including slate and granite, is very durable and resistant to the sun's ultraviolet UV rays but it is also very heavy and rigid. Metal such as copper and aluminum is relatively lightweight and can be bent into any shape but installation can be very specialized and the resulting structure is susceptible to condensation leaks. Tar including bitumen and asphalt is also lightweight and very waterproof but does not last very long in the sun and has very little body so that it is flimsy to handle. Improvements have been made by modifying or combining the materials with each other.

Asphalt shingles, by far the most popular roof cladding in North America, is basically tar and gravel supported by saturated felt. The stone granules in the gravel delay deterioration of the tar from UV rays and the tar holds the granules in place. Although this is a great innovation, the effect of the UV rays on the tar is not eliminated and the asphalt shingles eventually do shed their granules, curl, crack and lift from the underlying wood panels, and although they are laid in an overlapping manner, the shingles need to be replaced. Depending on the thickness of the shingle, and the trend has been towards thinner shingles, it is generally recommended to replace the roof shingles every ten to fifteen years.

Metal tiles are becoming more popular. However, they still suffer from the drawback that they are expensive because of the cost of the tile itself and also the complexity of installation and warehousing. Suitable metals for use in roof tiles are galvanized steel, aluminum, zinc or copper. Another disadvantage is that snow and ice easily slide off a metal roof and this creates a potential hazard to persons walking or working adjacent to the building or home and can destroy property such as eavestroughs, lower roofs, decks, vehicles and the like. For occupants of the home, the noise from rain falling on the roof can also be disturbing and condensation problems have also been observed. Another disadvantage is that smooth metal has a commercial look and the color will fade when exposed to UV rays.

One solution to these problems has been the application of a simulated stone covering to the metal tile. This reduces noise transmission to the interior of the building structure, restrains movement of snow and ice, remains colorfast and more residential in appearance. This process has improved since its start in 1956 and is now accepted as a proven process worldwide. A series of recent patents issued to BASF Corporation, including U.S. Pat. No. 6,540,829 provide a system for coating sheet metal coil with a resinous composition and embedding granular material in the wet surface of that coating to simulate the appearance of a traditional mineral covered asphalt shingle.

US 2002/0116886 provides a simulated wood shake made of metal which has a stone-chip coating to form a pattern of differently colored areas, the areas being coordinated with alternating raised and lowered sections of the metal roof panel. The product is a successful simulation of wood shakes but it is still expensive and difficult to install primarily because the metal needs to be sufficiently thick to maintain its shape under pressure and specialized installation accessories are required.

Another stone coating innovation is an exterior cladding consisting of a mixture of stone granules in an acrylic resin which is applied on an exterior wall system using a trowel. This demonstrates the use of synthetic adhesives to replace tar, and results in a cladding which is more resistant to UV rays.

A foil faced bitumen products is currently available and sold in association with the trademark Tegola®. This allows the cladding to be made thinner and easier to apply to a roof deck surface while giving it a protective layer of metal so that it can last longer. An exemplary description of a metal clad asphalt shingle is provided in U.S. Pat. No. 3,607,529 issued to Alcan Aluminum Corporation in 1971. One problem with this shingle is that the metal covers the whole of the backside, eliminating the sealing qualities of the tar. Another problem is that the weak unprotected metal foil is easily susceptible to scratches, puncture, tearing, fading and delamination.

Applicant is aware of only one attempt at combining stone, metal and tar to produce a superior cladding laminate. This was a New Zealand roof tile consisting of stone granules imbedded into a bitumen-based adhesive originating from a WWII British innovation branded as Decramastic and applied to a metal panel. These were supposed to last a lifetime. Instead, the granules would shed after only a few years. As a solution, the bitumen was eliminated and replaced with acrylic. The concept was to protect the metal, which was primitive galvanized steel sheets which had a tendency to rust easily from scratches and simple elements with a bituminous coating. The stone chips were only introduced by chance, and not for their UV resistant qualities, when sand was applied to the bitumen to solve the problem of panels sticking together in the shipping. When the aesthetic qualities of the sand were noticed, they began to use color co-coordinated natural stone chips. Although stone-coated metal is a great innovation, it still relies on the thickness of the metal for structural strength, walkability and water tightness.

An object of this invention is to provide an improved exterior cladding laminate which combines the beauty and protection of stone with the durable and preserving qualities of metal and the water repelling qualities and easy installation of tar including asphalt and bitumen. Significant material cost savings also may be achieved by selecting thinner and lighter materials which also makes the product easier to handle, cut and install hence also reducing installation costs.

SUMMARY OF THE INVENTION

In accordance with this invention, there is provided a construction laminate for use as an exterior cladding, the laminate having a plurality of layers including an asphaltic core body, a metallic facing applied to cover or partially cover an operatively outer side of the asphaltic core body to protect the asphaltic core body in exposed areas, and a granular coating applied to the metallic facing to provide an exterior stone coating appearance to the exterior cladding.

Most preferably, the asphaltic core body has an inner side which is coated to prevent sticking of laminates which are stacked for transportation to a work site and an adhesive tab, which can be covered with a release tape, for securing the laminates at the location where they are used.

The granular coating may be applied using a resinous coating applied to the metallic facing and protected with a seal applied over or mixed with the granular coating.

BRIEF DESCRIPTION OF THE DRAWINGS

In order to better understand the invention, a preferred embodiment is described below with reference to the accompanying drawings, in which:

FIG. 4b (drawn adjacent FIG. 4a) is a cross-sectional view of a pair of overlapping roofing tiles of FIG. 4a;

DESCRIPTION OF PREFERRED EMBODIMENT WITH REFERENCE TO DRAWINGS

A preferred embodiment of the invention is described with reference to the accompanying drawings in which a construction laminate is generally designated by reference numeral 20. The construction laminate 20 shown in FIGS. 1 and 2 has an asphaltic core body 22 consisting of bituminous materials commonly used for roofing applications also known as asphalt or tar and typically having a thickness of 0.3 to 25 mm or more, if fillers are added. Suitable materials will include asphalt saturated or asphalt coated web type materials which will include the following: felt, fiberglass, polyester, paper, polypropylene, and polyethylene. This list is not meant to be exhaustive but only exemplary of the type of material contemplated for use as the asphaltic core body comprising the invention. Fillers may consist of beads or sheets of polystyrene or other synthetic plastic materials embedded in asphalt for added bulk to increase thickness in the laminate.

The asphaltic core body 22 supports all the other elements comprising the construction laminate and is a material with which construction experts are familiar and for which installation is not problematic. The asphaltic core body 22 is wrapped with a metallic facing 24 that covers an operatively outer side of the asphaltic core body 22, a forward edge (drawn to the right of FIG. 1) and a portion of an inner side adapted to cover and protect an underlying surface (not shown) from the elements. The metallic facing 24 is made of metal sheet which is thin enough and malleable enough to allow it to conform to the shape of the asphaltic core body 22. Any suitable metal may be applied and selected according to the intended application and its availability and cost. In particular, it is contemplated that the metallic facing will be sheet metal selected from the group comprising steel, aluminum, copper, zinc, tin, alloys of aluminum and zinc commonly sold under the trademark GALVALUME and galvanized steel. Most preferably, the metallic facing 24 is adhesively attached to the asphaltic core body 22 by an adhesive asphalt coating which when warmed sufficiently can be tacky in nature. The metallic facing 24 will have a thickness between 0.015 mm and 1.000 mm and it may be given any desired color, for example, by coating the metallic facing with a suitable resin. It will be understood that the thickness of the metallic facing 24 is reduced as much as possible to minimize costs while being thick enough to resist impacts from debris such as branches or from hail stones. Where cost is not a concern, the metal facing 24 can be made as thick as known metal cladding. The metallic facing 24 also operates to preserve and reinforce the underlying asphaltic core body 22.

A protective granular coating 26 is applied over the metallic facing 24 so as to cover at least a portion of an outer surface. The combination of the granular coating 26 with the asphaltic core body 22 gives the metallic facing 24 sufficient support and strength to allow one to use a metal facing with minimum thickness and still have a durable and walkable surface. The granular coating 26 is primarily selected to give the construction laminate a more aesthetic appeal and will be selected accordingly from materials which may include the following: stone, stone chips, sand, ceramics, quartz, mica, slag, plastic, glass and combinations of the foregoing. The irregular texture provided by a granular coating 26 will also operate to increase resistance to sliding so that it is safer to walk on a roof cladding which has been made from the construction laminate 20 and to prevent sheets of ice and snow from sliding off a roof and thereby endangering passersby. The granular coating 24 also absorbs UV rays to further protect the other components.

In a preferred embodiment of the invention, the granular coating 26 is applied to the exterior surface of the metal facing 24 by first coating the metallic facing with a resinous coating such as acrylic or epoxy which is tacky and will retain the granular coating on its surface before it is dry. The resinous coating layer is generally indicated by reference numeral 28 in FIG. 1 and its thickness is exaggerated for illustration purposes. It will be understood that the resinous coating 28 will embed the components forming the granular coating 26 and will not be apparent as a distinct layer. Suitable substitutes for the resinous coating 28 will be apparent to those skilled in the art. It will also be understood that the resinous coating 28 may be tinted in order to provide the aesthetic finish desired and will of course vary in thickness according to the adhesion forces required to secure the granular coating. The resinous coating can also be mixed with the granules and applied simultaneously.

The assembly is completed by providing a protective sealant layer 30 over the granular coating 26. The sealant 30 which likewise has its thickness exaggerated in FIG. 1 for illustration purposes may consist of acrylic, epoxy, silicone and other materials as will be apparent to those skilled in the art and it may be clear or color tinted.

While exterior cladding is intended to be mounted to an underlying surface (not shown) such as a roof deck using conventional fasteners, including mechanical fasteners such as nails, it is suggested that construction laminates 20 made in accordance with the invention be secured to each other in an overlapping fashion using an adhesive tab 32. Preferably, the adhesive tab 32 is a bitumen-based material which is located on the inner side of the asphaltic core body 22 so as to overlap the asphaltic core body and the metallic facing 24 of an underlying laminate 20. The tab 32 may be formed as a continuous tape or consist of a plurality of spaced tab elements. The location of the tab 32 at the joint between the metal facing and the asphaltic core body reinforces the seal at a key weak area. Preferably, the outer surface of the tabs 32 is covered with a release tape (not shown) commonly used in the industry, to prevent sticking while shipping.

During transportation to a jobsite, it is desirable for the construction laminates to be stacked and for the individual laminates 20 to remain separate. Therefore, the preferred embodiment of the invention provides for an additional parting layer or undercoat 34 applied to the inner side of the asphaltic core body 22. A suitable material to use for the parting layer 34 is a fine granular material disposed in an adhesive coating which will be selected to be as economical as possible.

In use, it will be appreciated that the invention provides enormous advantages over the construction materials of the prior art, particularly those that have been used as roofing materials. Thus the problems associated with asphalt tiles that crack, curl and shed are overcome by reinforcing and preserving the asphaltic core body 22 with the metallic facing 24 and granular coating 26. Conversely, the asphaltic core body operates to weatherproof the metallic facing 24 to improve corrosion resistance and minimize infiltration of condensation onto a supporting surface. Since the thinnest possible metal sheet can be used, the expense of metal cladding does not need to be incurred.

Particular forms of exterior cladding embodying the invention will now be described with reference to FIGS. 3a to 8c.

Figures 3A, 3B:
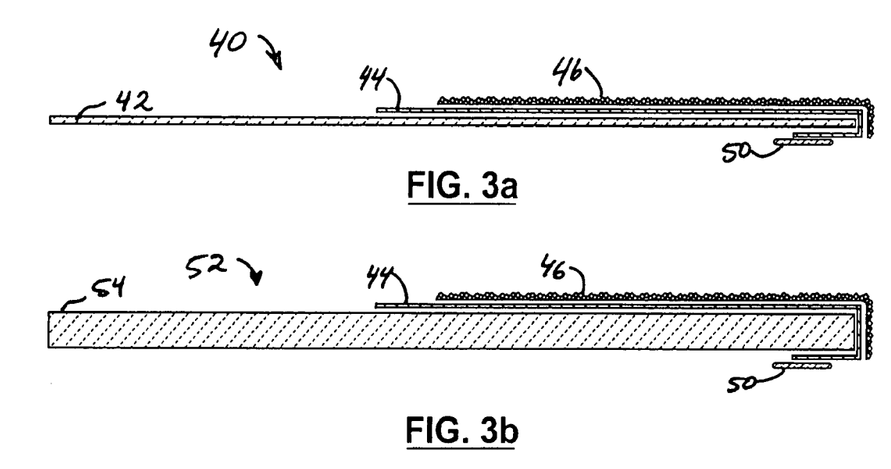
FIGS. 3a to 3c are cross-sectional views of a roofing tile made in accordance with the invention each having different thicknesses.
Figure 3C:
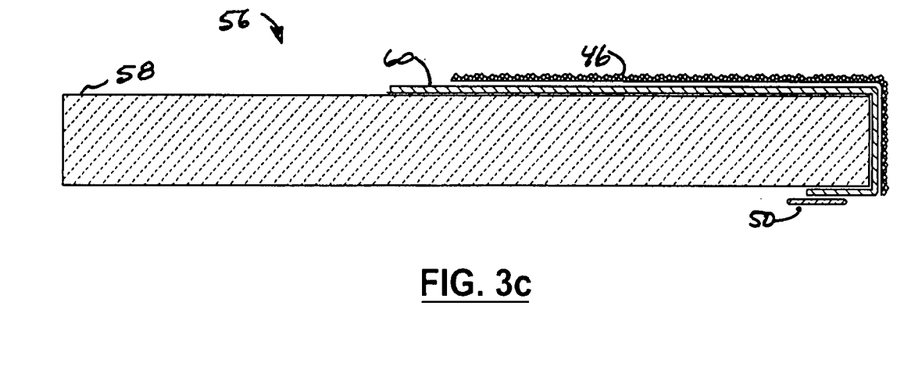

A number of roofing tiles made in accordance with the invention and each having a different thickness, are shown in FIGS. 3a to 3c. In FIG. 3a, a roofing tile is generally designated by reference numeral 40 and includes an asphaltic core body 42, a metallic facing 44 applied to cover a portion of the operatively outer side of asphaltic core body (topside as drawn in FIG. 3a) and adapted to leave the asphaltic core body 42 bare in areas which will be covered by adjacent roofing tiles as shown in the cross-sectional views of FIG. 4b and FIG. 5. The metallic facing 44 also covers the forward edge (drawn to the right of FIG. 3a) of the asphaltic core body 42 and a portion of the inner side (drawn on the bottom of FIG. 3a) of the asphaltic core body adjacent to the forward edge. The metallic facing 44 is thereby adapted to protect the underlying asphaltic core body 42 in exposed areas thereof as shown in the plan view of FIG. 4a.

Figure 4A:
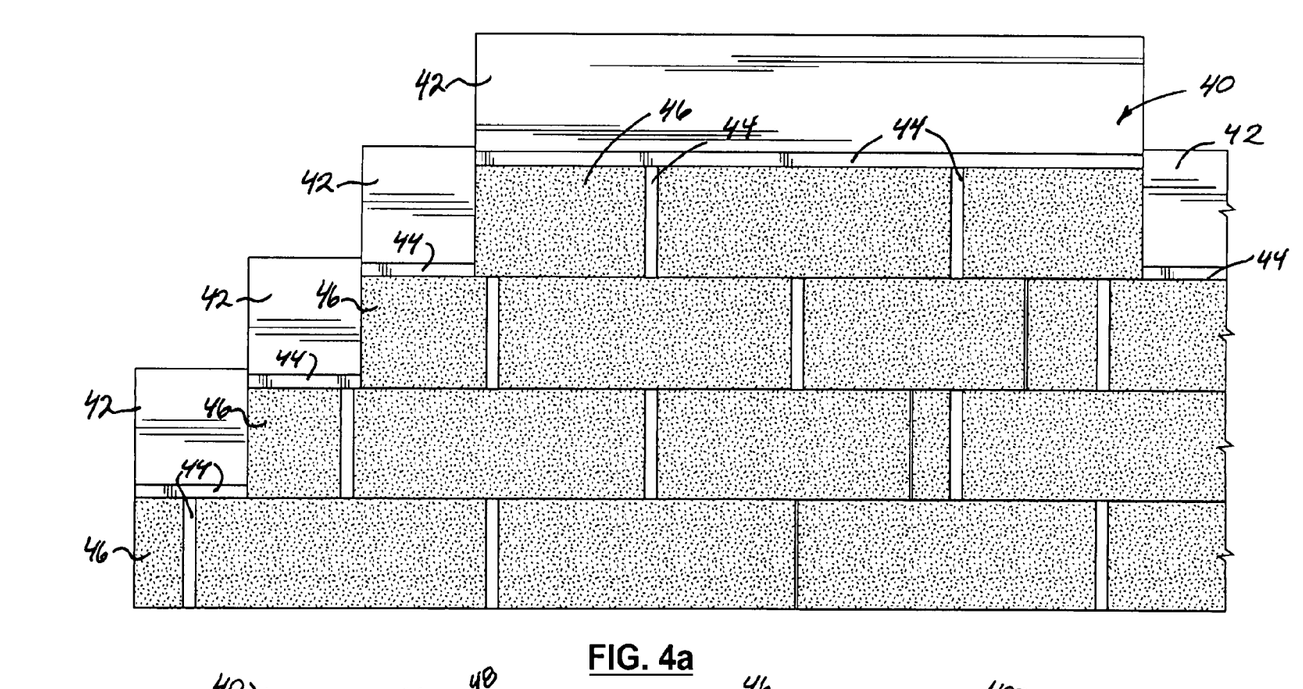
FIG. 4a is a top plan view of a plurality of roofing tiles made in accordance with the invention and disposed to lie over each other in overlapping fashion.
Figure 4B:
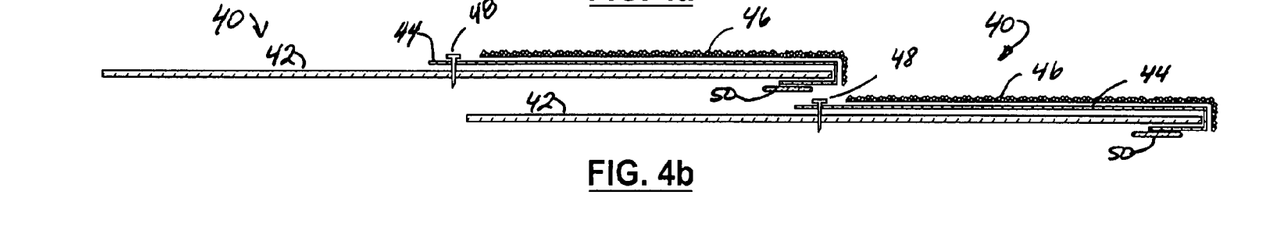
Figure 5:
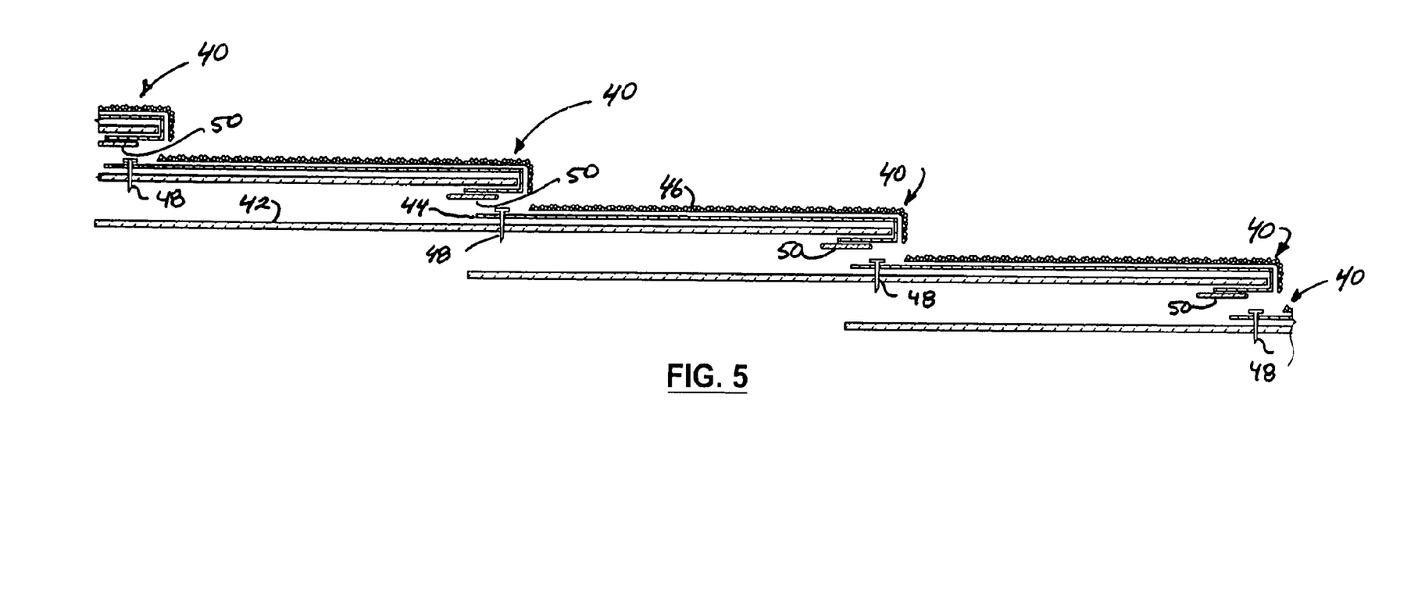
FIG. 5 is a cross-sectional view of a plurality of roofing tiles disposed to lie over each other in overlapping fashion.
Figure 6:
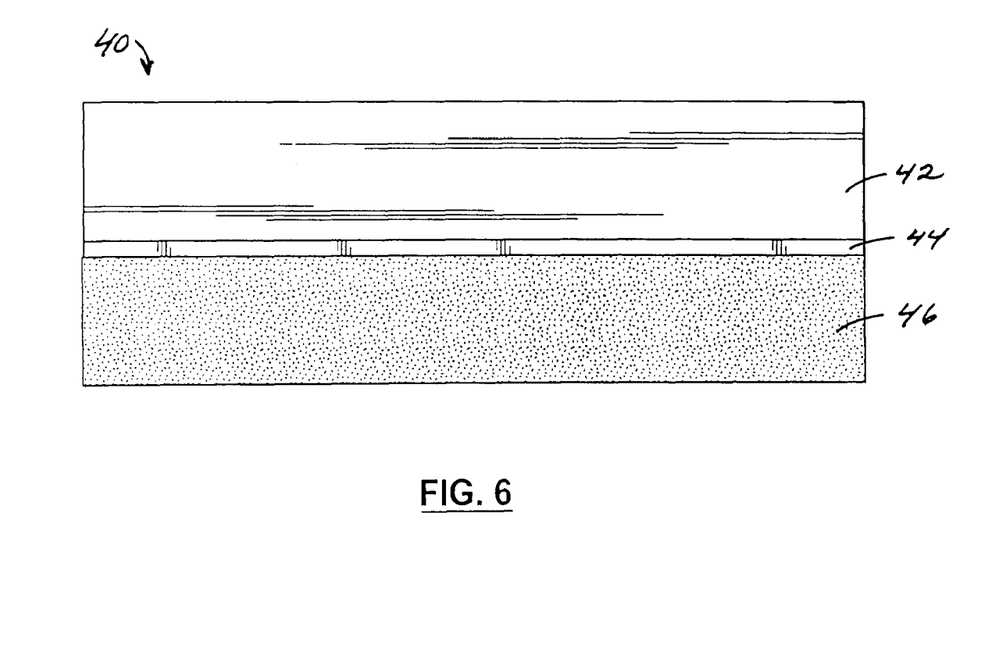
FIG. 6 is a top plan view of a roofing tile made in accordance with the invention.

The exposed areas are further protected by a granular coating 46 applied to the metallic facing 44 to cover substantially an outer surface of the metallic facing 44 and a forward edge (drawn to the right of FIG. 3a). The granular coating 46 leaves the metallic facing 44 bare in an area adjacent to the bare area of the asphaltic core body which as can be seen most clearly in FIG. 4b is adapted to receive a mechanical fastener or nail which couples the bare metallic facing 44 to the bare asphaltic core body 42 and an underlying surface (not shown). It will be noted that the metallic facing 44 is also bare on a portion covering the inner side of the asphaltic core body (drawn on the bottom of FIG. 3a). In this way, the granular coating 46 is adapted to provide an exterior stone coating appearance to the roof tile 40 as is more apparent from FIGS. 4a, 4b and 5 where all exposed areas are visible.

The roofing tile 40 also has an adhesive tab 50 on the inner side (drawn at the bottom of FIG. 3a) and disposed to lie partially over the metallic facing 44 and the asphaltic core body 42. As described with reference to the construction laminate of FIG. 1, the tab may be provided with a release tape and be formed in longitudinally extending strips or consist of a plurality of tab sections disposed side by side along the length of the joint between the metallic facing and the asphaltic core body. As can be seen most clearly with reference to the cross-sectional views of FIGS. 4b and 5, the adhesive tab 50 is positioned in order to bond metal to metal between adjacent roofing tiles and asphalt to asphalt in adjacent roofing tiles which are disposed to lie over each in overlapping fashion. Thus, when the roofing tile 20 is exposed to the sun, the bottom surface is heated to cause the adhesive tab 50 to become tacky so that it will adhere to adjoining surfaces. As demonstrated by the cross-sectional view of FIG. 5, each roofing tile 40 is secured at three points consisting of the fastener 48, the adhesive tab 50 of the roofing tile and the adhesive tab 50 of an overlying roofing tile. Installation of the roofing tiles is thus very easy to perform and does not require any specialized tools or accessories. The resulting seal between adjacent tiles is weather proof thereby improving the durability of the resulting roof structure.

Figure 1:
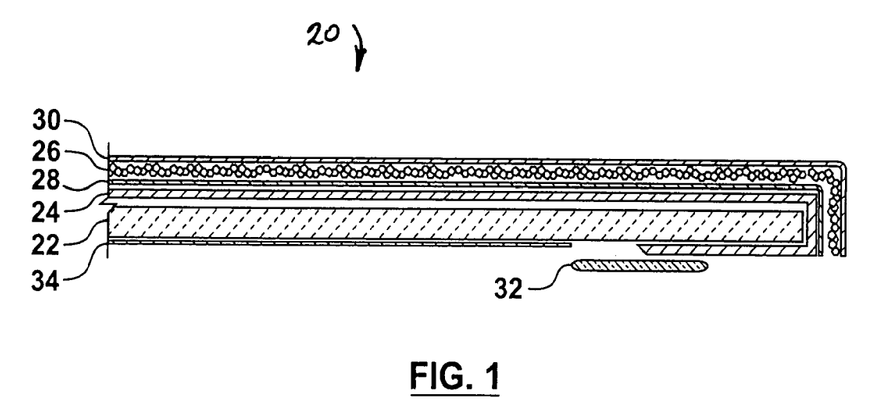
FIG. 1 is a cross-sectional view of a construction laminate made in accordance with the invention.
Figure 2:
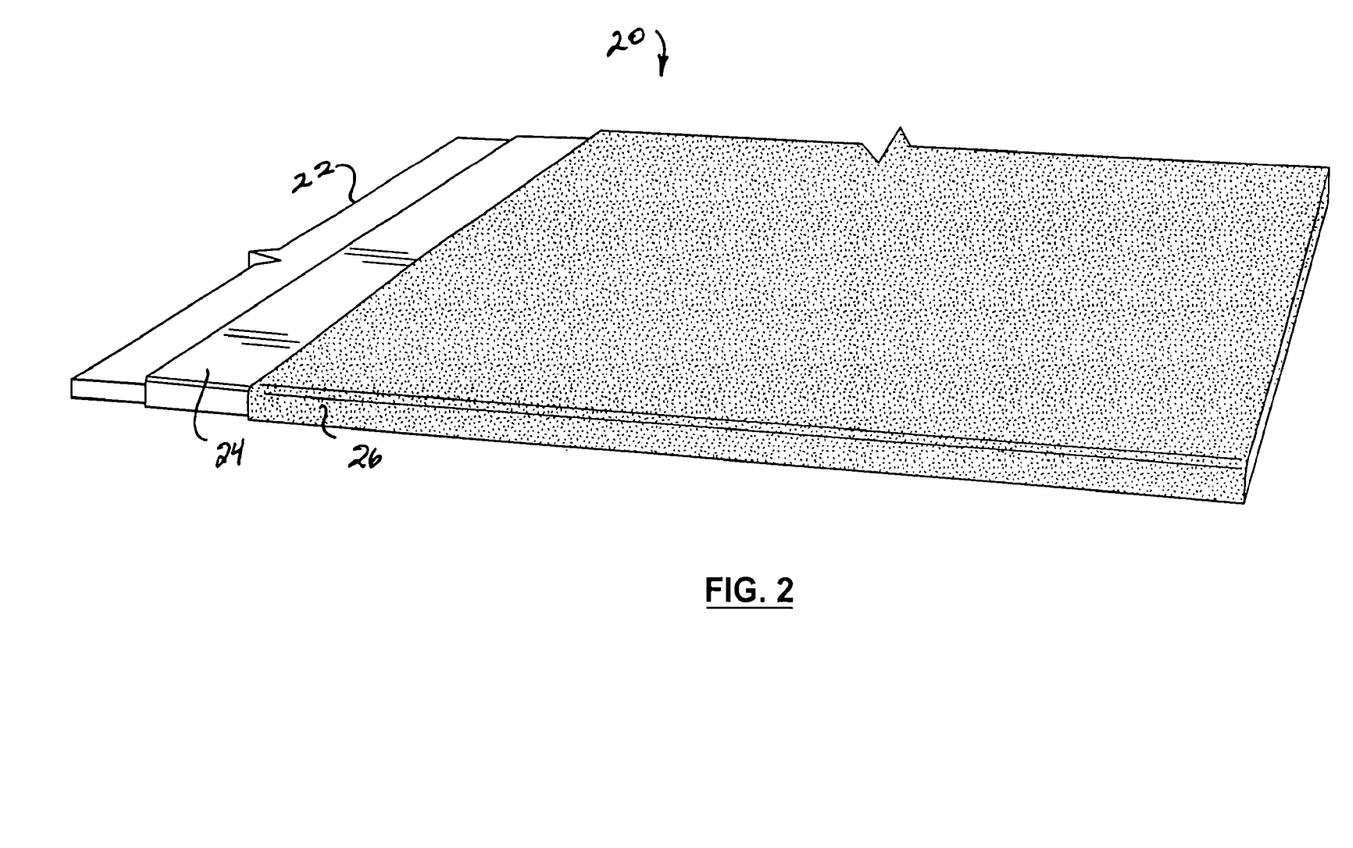
FIG. 2 is a perspective view of the construction laminate of FIG. 1.

In FIG. 3a as in the remaining figures, the roofing tile has been drawn to omit layers corresponding to the release coating 34 of FIG. 1, the resinous coating 28, and the sealant layer 30, for simplicity. It will of course be understood that these materials may form part of the roofing tile and they will be applied in the manner described with reference to FIGS. 1 and 2. Further the materials comprising the asphaltic core body, the metallic facing 44, and the granular coating 46 will correspond to the materials described with reference to FIG. 1 and layers 22, 24, and 26 respectively.

In FIG. 3b a roofing tile 52 is shown in which the asphaltic core body 54 is drawn to have a greater thickness thereby exemplifying an embodiment in which the body may include fillers such as polystyrene beads embedded in the asphalt, as described above with reference to FIG. 1. As the remaining layers correspond to those shown in FIG. 3a they have been assigned like reference numerals in the drawing. Likewise, in FIG. 3c a still thicker roofing tile 56 is shown having a still greater thickness imparted by the asphaltic core body 58 and a somewhat thicker metallic facing 60. Varying the thickness of the asphaltic core body as demonstrated by FIGS. 3b and 3c and the metallic facing as demonstrated in FIG. 3c allows one to fabricate the roofing tile with a three dimensional profile which is not planar and which can give the laminate additional architectural appeal if this is desired.

With planar tiles, architectural appeal may also be provided by varying the color and distribution of the granular coating 46. As will be seen in FIG. 4a, the granular coating 46 is disposed to leave selected areas of the underlying metallic facing 44 bare so as to simulate the appearance of a three tab shingle. Alternatively, as shown in FIG. 6a, the granular coating 46 may be uniformly distributed across the entire length of the roofing tile 40.

Figure 7A:
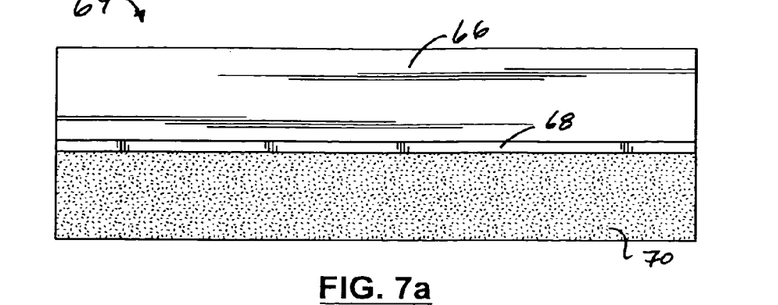
FIG. 7a is a top plan view of a wall panel made in accordance with the invention.
Figure 7B:
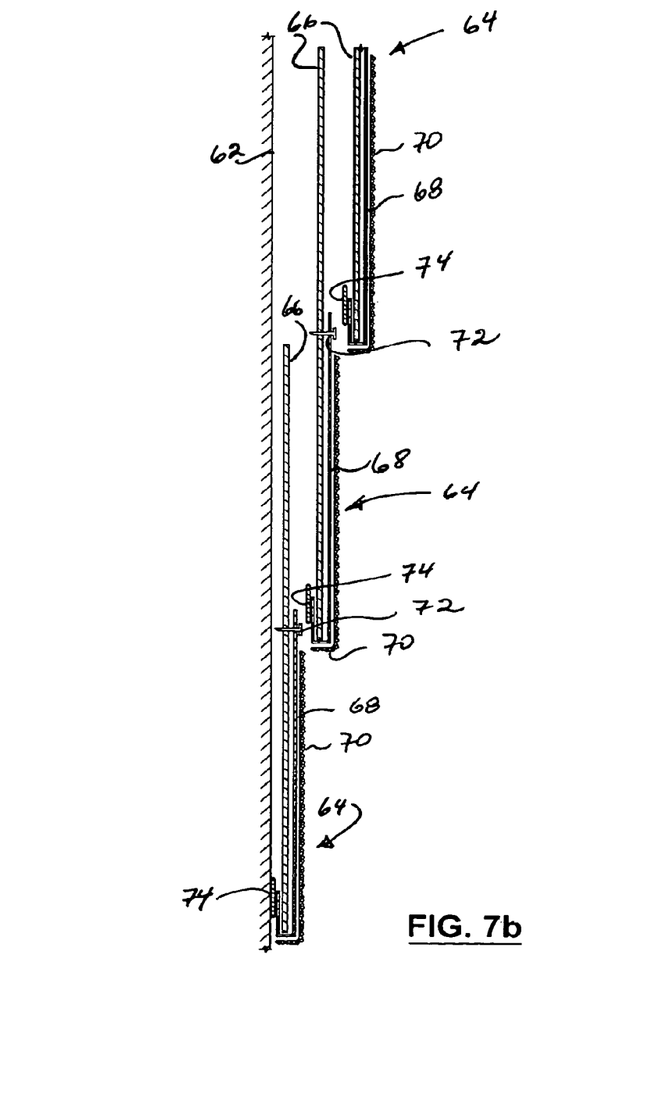
FIG. 7b (drawn adjacent FIG. 7a) is a cross-sectional view of a plurality of wall panels disposed to lie over each other in overlapping fashion and an associated wall surface.

In an alternative embodiment of the invention shown in FIGS. 7a and 7b, the construction laminate is shown for use as exterior cladding on an underlying wall surface indicated by reference numeral 62. The wall tile 64 shown in FIGS. 7a and 7b has a similar profile to the roofing tile 40 shown in FIGS. 4 to 6 and consists of an asphaltic core body 66 having an inner side adjacent to the wall surface 62 so as to cover and protect the wall. The outer side has a metallic facing 68 which protects the underlying asphaltic core body 66 in exposed areas and a granular coating 70 is applied to the metallic facing 68 to provide an exterior stone coating appearance to the wall cladding. The wall tiles 64 are applied to the wall surface 62 using nails 72 and adhesive tabs 74 in the manner described above with reference to the roofing tiles 40.

Figure 8A:
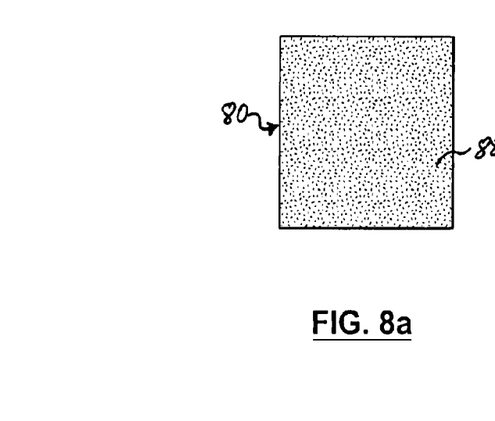
FIG. 8a is a plan view of an alternative embodiment of a construction laminate made in accordance with the invention.
Figure 8B:
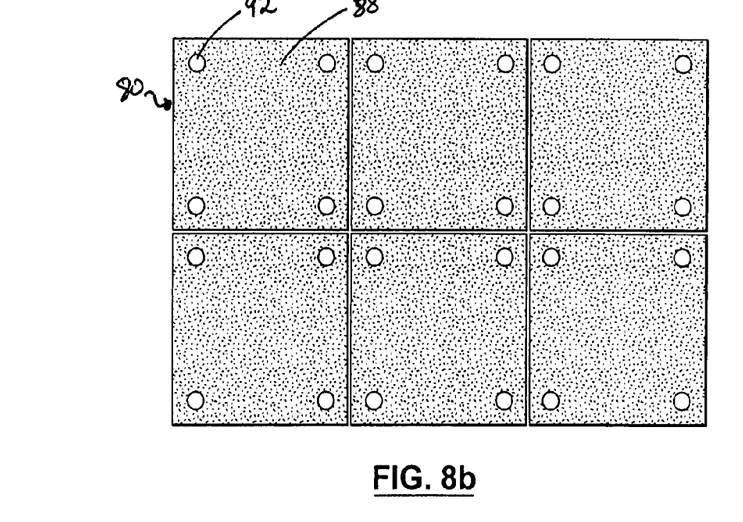
FIG. 8b is a plan view of a plurality of construction laminates of the kind shown in 8a disposed side by side.
Figure 8C:
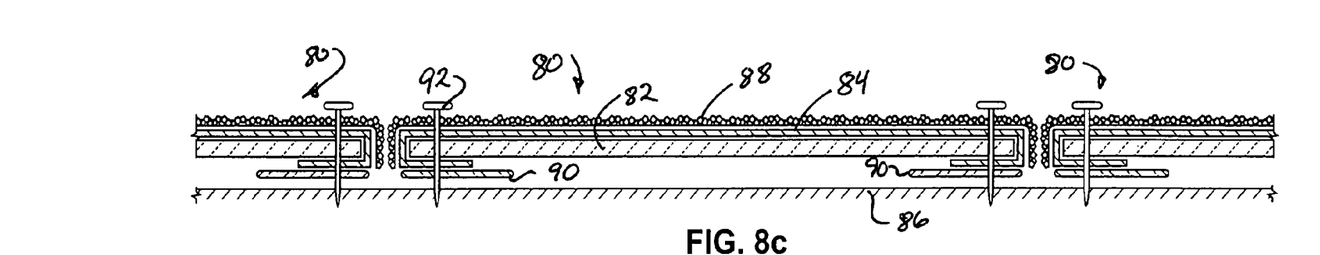
FIG. 8c is a cross-sectional view of a plurality of the laminates shown in FIG. 8b mounted side by side on a supporting surface.

A still further embodiment of a construction laminate made in accordance with the invention and which may for example be used as wall cladding or floor cladding, is shown in FIGS. 8a to 8c. It will be assumed that appropriate durable materials will be selected to fabricate a floor tile. In the drawings, a wall tile is designated by reference numeral 80. The wall tile has sides of equal length so that it has a square appearance as shown in the plan view of FIG. 8a. As in the other embodiments described, the wall tile 80 has an asphaltic core body 82 but in this case, the metallic facing 84 is co-extensive with the asphaltic core body so as to cover the entire exposed surface of the wall tile 80, the side edges, as well as a portion of the inner side of the asphaltic core body 82 adjacent to an underlying wall surface 86. A granular coating 88 is applied to the metallic facing 84 so as to be co-extensive with an outer surface and side edges so as to provide an exterior stone coating appearance to the wall cladding. As in the other embodiments described, each tile is provided with adhesive tabs 90 which overlap the joint between the metallic facing 84 and the asphaltic core body 82 on an inner side thereof so as to couple the tiles 80 to the lower surface 86. The assembly is further secured by nail fasteners 92 which penetrate the entire thickness of the tiles 80 so as to couple the tiles to the underlying wall surface 86.

It will be understood that several variations may be made to the above-described embodiment of the invention within the scope of the appended claims. In particular, it will be understood that the construction laminate may find many applications which are not limited to the cladding of a roof deck. The laminate could for example be used as a decorative or functional cladding for interior walls or exterior walls and, provided the granular coating 26 is sufficiently durable, it may also be applied as a flooring material.

The invention claimed is:

1. A construction laminate for use as exterior cladding on an underlying surface, the laminate having a plurality of layers including at least the following:
   (a) an asphaltic core body having an operatively outer side and an inner side adapted to cover and protect the underlying surface from elements;
   (b) a metallic facing applied to cover at least a portion of said operatively outer side of the asphaltic core body, to protect the underlying asphaltic core body in exposed areas thereof; and
   (c) a granular coating applied to said metallic facing to cover at least a portion of an outer surface thereof and adapted to provide an exterior stone coating appearance to the exterior cladding.

2. A construction laminate according to claim 1 in which the metallic facing is co-extensive with the outer side of the asphaltic core body.

3. A construction laminate according to claim 2 in which the metallic facing covers side edges of the asphaltic core body.

4. A construction laminate according to claim 1 in which the metallic facing only covers a portion of the outer side of the asphaltic core body thereby leaving the asphaltic core body bare in areas which are adapted in use, to be covered by adjacent laminates disposed to lie over each other in overlapping fashion.

5. A construction laminate according to claim 4 in which the granular coating covers substantially an outer surface of the metallic facing leaving the metallic facing bare in an area adjacent to said bare area of the asphaltic core body.

6. A construction laminate according to claim 4 in which the metallic facing covers a forward edge of the asphaltic core body and a portion of the inner side of the asphaltic core body adjacent said forward edge.

7. A construction laminate for use as exterior cladding on an underlying surface, the laminate having a plurality of layers including a least the following:
   (a) an asphaltic core body having an operatively outer side, and inner side adapted to cover and protect the underlying surface from elements, and side edges;
   (b) a metallic facing co-extensive with said outer side of the asphaltic core body and side edges and covering a portion of the inner side of the asphaltic core body adjacent said side edges;
   (c) a granular coating applied to said metallic facing co-extensive with an outer surface thereof and side edges and adapted to provide an exterior stone coating appearance to the exterior cladding.

* * * * *

UNITED STATES PATENT AND TRADEMARK OFFICE
CERTIFICATE OF CORRECTION

PATENT NO. : 8,551,601 B2  
APPLICATION NO. : 13/541878  
DATED : October 8, 2013  
INVENTOR(S) : Vince Guerra

Page 1 of 1

It is certified that error appears in the above-identified patent and that said Letters Patent is hereby corrected as shown below:

In the Claims:

In claim 7, column 8, line 36 change "a least to" -- at least --.

Signed and Sealed this
Tenth Day of December, 2013

Margaret A. Focarino
*Commissioner for Patents of the United States Patent and Trademark Office*